United States Patent
Hattori et al.

(10) Patent No.: US 8,669,321 B2
(45) Date of Patent: Mar. 11, 2014

(54) TIRE RUBBER COMPOSITION AND PNEUMATIC TIRE

(75) Inventors: Takayuki Hattori, Kobe (JP); Ai Matsuura, Kobe (JP); Takao Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 208 days.

(21) Appl. No.: 12/960,836

(22) Filed: Dec. 6, 2010

(65) Prior Publication Data

US 2011/0136968 A1 Jun. 9, 2011

(30) Foreign Application Priority Data

Dec. 7, 2009 (JP) ................................. 2009-277821

(51) Int. Cl.
*C08L 9/00* (2006.01)

(52) U.S. Cl.
USPC ........... 524/572; 524/313; 524/424; 524/436; 524/571

(58) Field of Classification Search
None
See application file for complete search history.

(56) References Cited

U.S. PATENT DOCUMENTS

| 7,799,870 | B2 * | 9/2010 | Hergenrother et al. | ....... 525/100 |
|---|---|---|---|---|
| 2006/0063879 | A1 * | 3/2006 | Zanzig | ........... 524/493 |
| 2007/0066744 | A1 * | 3/2007 | Weydert et al. | ............ 524/493 |
| 2007/0155861 | A1 | 7/2007 | Chen et al. | |
| 2007/0155890 | A1 | 7/2007 | Chen et al. | |
| 2011/0152405 | A1 * | 6/2011 | Thomasson et al. | .......... 523/155 |

FOREIGN PATENT DOCUMENTS

| EP | 1 577 341 A1 | 9/2005 |
|---|---|---|
| EP | 1 806 240 A2 | 7/2007 |
| JP | 2001-11245 A | 1/2001 |
| JP | 2002-3652 A | 1/2002 |
| JP | 2003-552065 A | 7/2003 |
| JP | 2004-2843 A | 1/2004 |
| JP | 2006-169434 * | 6/2006 |
| JP | 3933207 B2 | 3/2007 |
| JP | 2008-106205 A | 5/2008 |
| JP | 2011-38011 A | 2/2011 |
| JP | 2011-74240 A | 4/2011 |
| WO | WO 00/53671 A1 | 9/2000 |
| WO | WO 2008/119465 A1 | 10/2008 |
| WO | WO 2009/112463 A1 * | 9/2009 |

OTHER PUBLICATIONS

Machine-generated translation of JP 2006-169434 into the English language.*
European Search Report No. 10009279 dated Apr. 6, 2011.

* cited by examiner

*Primary Examiner* — Marc Zimmer
(74) *Attorney, Agent, or Firm* — Birch, Stewart, Kolasch & Birch, LLP

(57) ABSTRACT

It is an object of the present invention to provide a tire rubber composition and a pneumatic tire produced using the rubber composition, which improve mechanical strength, abrasion resistance, rolling resistance, wet grip performance, and dry grip performance in good balance. The present invention relates to a tire rubber composition comprising: a rubber component that contains a modified diene rubber; and a silica component that contains a silica surface-treated with a silane coupling agent, wherein the amount of the modified diene rubber in 100% by mass of the rubber component is 15% by mass or more, and the dispersion ratio of the silica component is 70% or higher.

8 Claims, No Drawings

TIRE RUBBER COMPOSITION AND PNEUMATIC TIRE

TECHNICAL FIELD

The present invention relates to a tire rubber composition and a pneumatic tire produced using the rubber composition.

BACKGROUND ART

Tire rubber compositions containing silica as a filler are often inferior to those containing carbon black in abrasion resistance and mechanical strength (tensile strength and elongation at break). In order to improve such properties, a method using a silane coupling agent and a method using microparticulate silica which has high reinforcing properties are known.

In the case of using a silane coupling agent, silica may not be sufficiently reacted with the silane coupling agent, and unreacted silica may remain poorly dispersed. Here, the reaction between the silane coupling agent and the silica can be promoted if the kneading temperature is increased. However, an excessive increase in the kneading temperature may cause an increase in Mooney viscosity, and thereby the processability may be deteriorated and rubber burning (scorching) may occur.

For solving the above problems, Patent Documents 1 and 2 disclose a tire (especially tread) rubber composition containing a silica (surface-treated silica) with its surface pretreated with a silane coupling agent. This rubber composition may improve properties such as abrasion resistance. However, the investigations by the present inventors show that the improvement is not sufficient, and there is room for improvement especially in the case of using a modified diene rubber that has been recently increasingly used for achieving low fuel consumption, in particular, a modified diene rubber having two or more modified groups in one molecule.

Patent Document 1: JP 3933207 B
Patent Document 2: JP 2001-11245 A

SUMMARY OF THE INVENTION

An object of the present invention is to provide a tire rubber composition and a pneumatic tire produced using the rubber composition, which improve mechanical strength, abrasion resistance, rolling resistance, wet grip performance, and dry grip performance in good balance so as to solve the above problems.

The present invention relates to a tire rubber composition comprising: a rubber component that contains a modified diene rubber; and a silica component that contains a silica surface-treated with a silane coupling agent, wherein the amount of the modified diene rubber in 100% by mass of the rubber component is 15% by mass or more, and the dispersion ratio of the silica component is 70% or higher.

The modified diene rubber desirably has two or more modified groups in one molecule thereof.

The tire rubber composition is desirably obtained by kneading the rubber component and the silica component at a kneading start temperature of 68° C. or lower.

The present invention also relates to a pneumatic tire produced using the above rubber composition.

The rubber composition according to the present invention comprises a rubber component that contains a predetermined amount of a modified diene rubber; and a silica component that contains a silica surface-treated with a silane coupling agent, and the dispersion ratio of the silica component is a specific value or higher. Accordingly, the rubber composition of the present invention provides a pneumatic tire that has improved mechanical strength, abrasion resistance, rolling resistance, wet grip performance, and dry grip performance in good balance.

BEST MODE FOR CARRYING OUT THE INVENTION

A rubber composition of the present invention comprises a rubber component that contains a predetermined amount of a modified diene rubber; and a silica component that contains a silica surface-treated with a silane coupling agent, and the dispersion ratio of the silica component is a specific value or higher.

Particles of surface-treated silica may aggregate with one another or become bulky so that kneading with them is difficult, which tends to cause poor dispersion. Especially in the case where a modified diene rubber (particularly, a modified diene rubber whose number of modified groups in one molecule is two or more) and surface-treated silica are used in combination, such poor dispersion more remarkably occurs.

The present invention solves the above problems by keeping the dispersion ratio of the silica component at a specific value or higher with, for example, a method including lowering the kneading start temperature in the process of kneading the silica component (containing surface-treated silica) with a rubber component and other components. Thus, the present invention improves mechanical strength, abrasion resistance, rolling resistance, wet grip performance, and dry grip performance in good balance.

The rubber composition of the present invention contains a modified diene rubber as the rubber component. Thereby, silica and the rubber component are more strongly bonded to each other, energy loss in the frequency range corresponding to rolling motion of tires on a road surface is decreased, and thus rolling resistance is reduced. In the case where the modified diene rubber is used in combination with surface-treated silica, the dispersion ratio of the silica component may be deteriorated, as described above. In contrast, the present invention solves the problem by keeping the dispersion ratio of the silica component at a specific value or higher with, for example, a method including lowering the kneading start temperature in the process of kneading the silica component with the rubber component and other components. Thus, the rolling resistance is more improved without deteriorating other performances.

The larger the number of modified groups in the modified diene rubber is, the more improved the rolling resistance is, while the less dispersed the surface-treated silica is. Accordingly, in the mode in which the modified diene rubber has two or more modified groups in one molecule, the dispersion ratio of the silica component may be particularly lowered. In contrast, the present invention solves the problem by keeping the dispersion ratio of the silica component at a specific value or higher with, for example, a method including lowering the kneading start temperature in the process of kneading the silica component with the rubber component and other components. Thus, the rolling resistance is more improved without deteriorating other performances.

The amount of the modified diene rubber in 100% by mass of the rubber component is 15% by mass or more, desirably 25% by mass or more, more desirably 50% by mass or more, and further desirably 75% by mass or more. If the amount is less than 15% by mass, the rolling resistance may not be sufficiently improved. The upper limit of the amount of the modified diene rubber is not particularly limited, and may be 100% by mass.

Examples of the modified diene rubber include epoxidized natural rubber (ENR), butadiene rubber whose main chain and/or end are modified (modified BR), and solution polymerized styrene-butadiene rubber whose main chain and/or end are modified (modified S-SBR).

As the ENR, commercially available ENR (ENR25 and ENR50 produced by MRB (in Malaysia), and the like may be used, or the ENR may be prepared by epoxidizing natural rubber (NR). The process of epoxidizing NR is not specifically limited. Examples thereof may include the chlorohydrin process, the direct oxidation process, the hydrogen peroxide process, the alkyl hydroperoxide process, and the peracid process (disclosed in JP H04-26617 B, JP H02-110182 A, GB 2113692, and the like). Examples of the peracid process include a process in which an organic peracid such as peracetic acid or performic acid is reacted with NR. Examples of the NR to be epoxidized include those generally used in the rubber industry, such as RSS#3 and TSR20, and latexes thereof. The ENR may be used alone, or two or more kinds thereof may be used in combination. That is, ENRs having different epoxidation degrees may be used in combination.

The amount of the ENR in 100% by mass of the rubber component is desirably 30% by mass or more, more desirably 50% by mass or more, and further desirably 75% by mass or more. The amount may be 100% by mass, and is desirably 95% by mass or less, more desirably 90% by mass or less, and further desirably 85% by mass or less. When the amount of the ENR is within such a range, the wet grip performance and crack resistance are improved, and favorable rolling resistance is obtainable.

As the modified BR, ones obtained by treating a BR generally used in the tire industry with a modifying agent may be used. Examples of the modifying agent include 3-aminopropyldimethylmethoxysilane, 3-aminopropylmethyldimethoxysilane, 3-aminopropylethyldimethoxysilane, 3-aminopropyltrimethoxysilane, 3-(2-aminoethylamino)propyltrimethoxysilane, and N-methylpyrrolidone. These may be used alone, or two or more kinds thereof may be used in combination.

As the modification method with the modifying agent, conventional methods such as those described in JP H06-53768 B, JP H06-57767 B and the like may be used.

The amount of the modified BR in 100% by mass of the rubber component is desirably 5% by mass or more, more desirably 15% by mass or more, and further desirably 25% by mass or more. The amount is desirably 60% by mass or less, more desirably 45% by mass or less, and further desirably 40% by mass or less. When the amount of the modified BR is within such a range, favorable abrasion resistance, crack resistance, and rolling resistance are achieved while wet grip performance and mechanical strength (tensile strength and elongation at break) are maintained.

As the modified SBR, ones obtained by treating a SBR generally used in the tire industry (solution polymerized SBR (S-SBR) or the like) with a modifying agent may be used. The same modifying agent and modification method as in the modified BR may be used.

The amount of the modified SBR in 100% by mass of the rubber component is desirably 15% by mass or more, more desirably 35% by mass or more, and further desirably 45% by mass or more. The amount is desirably 75% by mass or less, more desirably 65% by mass or less, and further desirably 60% by mass or less. When the amount of the modified SBR is within such a range, favorable wet grip performance is obtainable. If the rubber composition contains rubbers such as BR, NR, modified BR, and modified NR in addition to the modified SBR, favorable abrasion resistance, crack resistance, and rolling resistance are achieved.

The rubber composition of the present invention may contain materials generally used in the tire industry as a rubber component other than the modified diene rubber, such as natural rubber (NR), isoprene rubber (IR), styrene-isoprene-butadiene rubber (SIBR), ethylene-propylene-diene rubber (EPDM), chloroprene rubber (CR), and acrylonitrile-butadiene rubber (NBR).

In the rubber composition of the present invention, surface-treated silica is used as a silica component. The surface-treated silica can be obtained by treating the surface of (untreated) silica with a silane coupling agent.

Examples of the silica used for producing the surface-treated silica include dry silica (silicic anhydride) and wet silica (hydrous silicic acid). The wet silica is desirable because of its excellent reinforcing properties.

The silane coupling agent used for production of the surface-treated silica is not particularly limited, and a silane coupling agent conventionally used with silica in the rubber industry may be used. Examples thereof include bis(3-triethoxysilylpropyl)tetrasulfide, bis(3-triethoxysilylpropyl)trisulfide, and bis(3-triethoxysilylpropyl)disulfide. The silane coupling agent may be a copolymer including units A represented by formula (1) and units B represented by formula (2), in which the proportion of the units B is 1 to 70 mol % of the total molar amount of the units A and the units B (hereinafter, also referred to as copolymerized silane coupling agents). These silane coupling agents may be used alone, or two or more kinds thereof may be used in combination. Among these, bis(3-triethoxysilylpropyl)tetrasulfide and the copolymerized silane coupling agents are desirable because of excellent reactivity with diene rubber or a silica surface, and high effects of improving rubber reinforcement.

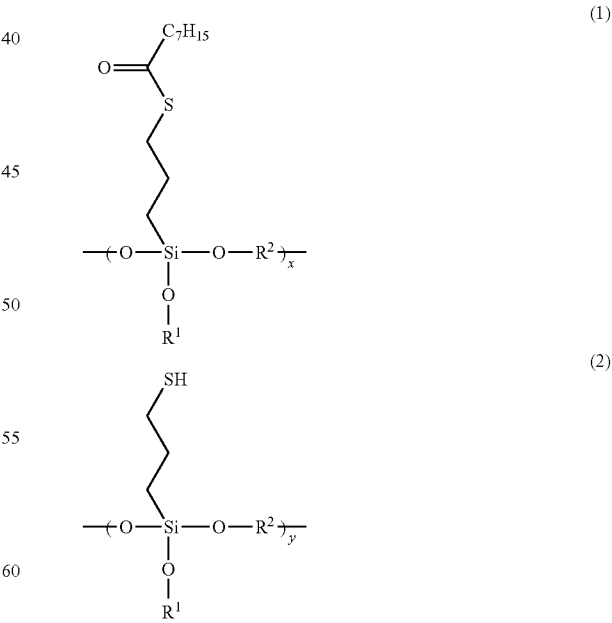

In formulas (1) and (2), x and y are each an integer of 1 or more. $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group. $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group. $R^1$ and $R^2$ may form a ring structure together.

In the copolymerized silane coupling agent, the molar ratio of the unit A and the unit B satisfies the above condition. Thus, the copolymerized silane coupling agent suppresses an increase in viscosity during processing in comparison with polysulfide silanes such as bis-(3-triethoxysilylpropyl)tetrasulfide. This is presumably for the following reason. Since the sulfide portion of the unit A is the C—S—C bond, the sulfide portion is thermally stable compared with tetrasulfide or disulfide. Accordingly, an increase in Mooney viscosity is small.

In the case where the molar ratio of the unit A and the unit B satisfies the condition, the copolymerized silane coupling agent suppresses a reduction in scorch time in comparison with mercaptosilanes such as 3-mercaptopropyltrimethoxysilane. This is presumably for the following reason. The unit B has a mercaptosilane structure, and the —$C_7H_{15}$ portion of the unit A covers the —SH group of the unit B. Accordingly, the —SH group is less likely to be reacted with polymers, and scorching is less likely to occur.

Examples of the halogen for $R^1$ include chlorine, bromine, and fluorine.

Examples of the branched or unbranched $C_{1-30}$ alkyl group for $R^1$ and $R^2$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The number of carbons of the alkyl group is desirably 1 to 12.

Examples of the branched or unbranched $C_{1-30}$ alkylene group for $R^1$ and $R^2$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The number of carbons of the alkylene group is desirably 1 to 12.

Examples of the branched or unbranched $C_{2-30}$ alkenyl group for $R^1$ and $R^2$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The number of carbons of the alkenyl group is desirably 2 to 12.

Examples of the branched or unbranched $C_{2-30}$ alkenylene group for $R^1$ and $R^2$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The number of carbons of the alkenylene group is desirably 2 to 12.

Examples of the branched or unbranched $C_{2-30}$ alkynyl group for $R^1$ and $R^2$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The number of carbons of the alkynyl group is desirably 2 to 12.

Examples of the branched or unbranched $C_{2-30}$ alkynylene group for $R^1$ and $R^2$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The number of carbons of the alkynylene group is desirably 2 to 12.

In the copolymerized silane coupling agent, the total number of repetition (x+y) of the number of repetition (x) of the unit A and the number of repetition (y) of the unit B is desirably 3 to 300. If the total number is within such a range, the —$C_7H_{15}$ of the unit A covers the mercaptosilane of the unit B. Accordingly, the reduction in scorch time can be suppressed, and simultaneously, good reactivity with silica and a rubber component can be secured.

Examples of the copolymerized silane coupling agent include NXT-Z30, NXT-Z45, and NXT-Z60, all produced by Momentive Performance Materials. These may be used alone, or two or more kinds thereof may be used in combination.

A method for producing the surface-treated silica is not particularly limited as long as capable of covering all or part of the surface of silica. Examples thereof include a method including mixing silica and a silane coupling agent in the absence of a solvent, and a method including mixing silica and a silane coupling agent in the presence of a solvent and then removing the solvent.

In the case where the surface-treated silica is produced by mixing of silica and a silane coupling agent, the amount of the silane coupling agent is desirably 1.0 part by mass or more, and more desirably 1.5 parts by mass or more, per 100 parts by mass of silica. If the amount is less than 1.0 part by mass, silica may not be sufficiently treated. The amount of the silane coupling agent is desirably 20 parts by mass or less, and more desirably 15 parts by mass or less, per 100 parts by mass of silica. If the amount of the silane coupling agent exceeds 20 parts by mass, the performance-improving effects tend not to correspond to a cost increase. In addition, an unreacted silane coupling agent tends to remain on the surface of silica, and processability tends to be deteriorated.

In the case where the surface-treated silica is produced by mixing of silica and a silane coupling agent, the mixing temperature is desirably 120° C. or higher, and more desirably 125° C. or higher. If the mixing temperature is lower than 120° C., the silica and the silane coupling agent may not be sufficiently reacted, which may have an adverse influence on processability and performances. The mixing temperature is 180° C. or lower, and desirably 175° C. or lower. If the mixing temperature exceeds 180° C., the stability of the silane coupling agent may be lost, which may have an adverse influence on performances.

The nitrogen adsorption specific surface area ($N_2SA$) of the silica used for production of the surface-treated silica is desirably 50 m$^2$/g or more, more desirably 100 m$^2$/g or more, and further desirably 150 m$^2$/g or more. The larger $N_2SA$ the silica has, the more difficult it is to disperse the silica in the rubber composition. Accordingly, the present invention is especially effective.

The $N_2SA$ of the silica may be determined by the BET method in accordance with ASTM-D-4820-93.

The surface-treated silica may be powder, but is desirably a granule-type one obtained by granulating powder. Thereby, the dispersion ratio of the silica component is more improved.

The amount of the surface-treated silica is desirably 20 parts by mass or more, more desirably 30 parts by mass or more, further desirably 40 parts by mass or more, and particularly desirably 50 parts by mass or more, per 100 parts by mass of the rubber component. If the amount is less than 20 parts by mass, the improvement effects may not be sufficiently exerted by the surface-treated silica. The amount of the surface-treated silica is desirably 120 parts by mass or less, more desirably 100 parts by mass or less, further desirably 80 parts by mass or less, and particularly desirably 70 parts by mass or less, per 100 parts by mass of the rubber component. The surface-treated silica in an amount exceeding 120 parts by mass may cause difficulty in keeping the dispersion ratio of the silica component at a specific value or higher.

The amount of the surface-treated silica used herein means the mass of a mixture obtained by mixing silica with a silane coupling agent upon production of the surface-treated silica. The mixture may contain untreated silica and an unreacted silane coupling agent used for production of the surface-treated silica.

In the rubber composition of the present invention, the surface-treated silica and a normal silica (silica whose surface is not treated with a silane coupling agent) may be used together as the silica component. In this case, the mass ratio of the amount of the surface-treated silica to the amount of the normal silica (amount of surface-treated silica/amount of normal silica) is desirably 30/70 or higher, more desirably 50/50 or higher, and further desirably 70/30 or higher.

The dispersion ratio of the silica component in the rubber composition of the present invention is 70% or higher, desirably 75% or higher, more desirably 85% or higher, and particularly desirably 90% or higher. Such a ratio provides good abrasion resistance and mechanical strength.

The dispersion ratio of the silica component used herein means a dispersion ratio of all silicas contained in the rubber composition, which value reflects both the values of the surface-treated silica and untreated silica. The dispersion ratio of the silica component can be determined by the method described in examples mentioned later.

The method that gives the dispersion ratio of the silica component specified in the present invention is not particularly limited. One example is a method in which the kneading start temperature in the process of kneading a silica component with a rubber component and other components is made lower than the conventional kneading start temperature (about 70° C. or higher). More specifically, the kneading start temperature in the process of kneading a silica component with a rubber component and other components is desirably 68° C. or lower, more desirably 55° C. or lower, and further desirably 45° C. or lower.

It is sufficient that the kneading time in the process of kneading a silica component with a rubber component and other components is appropriately adjusted according to the kneading start temperature and the amount of the materials to be kneaded. It is also sufficient that the discharging temperature in the process of kneading a silica component with a rubber component and other components is similar to the conventional discharging temperature (about 120 to 160° C.).

Other examples of the method that gives the dispersion ratio of the silica component specified in the present invention include a method described in JP 2005-325172 A including coagulating a rubber latex with silica, and a method including adding silica to a solution in which solution polymerization of the modified diene rubber has been conducted after the polymerization has stopped, stirring the resultant solution, and removing a solvent from the solution.

In the rubber composition of the present invention, the surface-treated silica is used as the silica component. Accordingly, addition of a silane coupling agent in the kneading process can be omitted, but it is desirable to add a silane coupling agent separately in order to further improve the dispersion ratio of the silica component. The same silane coupling agent as that upon production of the surface-treated silica may be used as a silane coupling agent to be added separately.

The amount of the silane coupling agent to be added separately is desirably 0.1 parts by mass or more, more desirably 0.5 parts by mass or more, further desirably 1 part by mass or more, and particularly desirably 1.5 parts by mass or more, per 100 parts by mass of the silica component. The silane coupling agent in an amount of less than 0.1 parts by mass may not sufficiently improve the dispersion ratio of the silica component. The amount is desirably 15 parts by mass or less, more desirably 10 parts by mass or less, further desirably 5 parts by mass or less, and particularly desirably 3 parts by mass or less, per 100 parts by mass of the silica component. The silane coupling agent in an amount exceeding 15 parts by mass tends not to give the effects corresponding to a cost increase.

In addition to the above-mentioned materials, the rubber composition of the present invention may optionally contain, as appropriate, materials generally used in the tire industry such as zinc oxide, stearic acid, age resistors, sulfur, and vulcanization accelerators. The rubber composition may contain carbon black as a filler other than the silica component; however, the ratio of the silica component in the fillers is desirably higher from the viewpoint of reduction in rolling resistance, improvement in wet grip performance, countermeasures against oil resource depletion, and reduction in $CO_2$ emission.

The rubber composition of the present invention may be produced by a known method. For example, the rubber composition is produced by a method including kneading the aforementioned ingredients with a rubber kneader such as an open roll mill, a Banbury mixer, or an internal mixer, and then vulcanizing the resultant mixture.

The rubber composition of the present invention may be used for tire components, and particularly suitably used for a tread.

The pneumatic tire of the present invention may be produced by a usual method with the above rubber composition.

More specifically, an unvulcanized rubber composition containing the aforementioned ingredients is extruded and processed into a shape of a tire component such as a tread, and then molded with other tire components in a usual manner on a tire building machine to form an unvulcanized tire. Then, the unvulcanized tire is subjected to heating and pressing in a vulcanizer to produce the pneumatic tire of the present invention.

Usage of the pneumatic tire of the present invention is not specifically limited, and the tire is particularly suitably used for passenger vehicles, trucks and buses.

EXAMPLES

The present invention will be more specifically described based on examples, and the present invention is not limited to these examples.

In the following, the respective chemical agents used in examples and comparative examples are listed.

ENR: ENR-25 produced by MRB (in Malaysia) (epoxidation degree: 25 mol %, Tg: −47° C.)

NR: RSS#3

BR: BR150B produced by Ube Industries, Ltd. (cis content: 97% by mass, $ML_{1+4}$ (100° C.): 40, viscosity of 5% solution in toluene at 25° C.: 48 cps, Mw/Mn: 3.3)

Modified BR: produced by the following method

Modified S-SBR: produced by modifying one end of Nipol NS116R (produced by Zeon Corporation) with N-methylpyrrolidone (styrene content: 21% by mass, Tg: −25° C.)

Surface-treated silica (1): COUPSIL8113 GR produced by EVONIK-DEGUSSA (granule-type of the following surface-treated silica (2))

Surface-treated silica (2): COUPSIL8113 produced by EVONIK-DEGUSSA (composed of silica: Ultrasil VN3 ($N_2SA$: 175 m$^2$/g) and silane coupling agent: Si-69) (obtained by reacting 12.7 parts by mass of the silane coupling agent with 100 parts by mass of the silica)

Surface-treated silica (3): produced by the following method

Silica: Ultrasil VN3 produced by EVONIK-DEGUSSA ($N_2SA$: 175 m$^2$/g) (untreated silica)

Silane coupling agent (1): Si-69 produced by EVONIK-DEGUSSA (bis(3-triethoxysilylpropyl)tetrasulfide)

Silane coupling agent (2): NXT-Z45 produced by Momentive Performance Materials (copolymer of unit A and unit B (unit A: 55 mol %, unit B: 45 mol %))

Vegetable oil: refined soybean oil (S) produced by The Nisshin OilliO Group, Ltd. (iodine value: 131, fatty acid component having 18 or more carbons: 84.9%)

Mineral oil: PS-32 produced by Idemitsu Kosan Co. Ltd.

Alkaline fatty acid metal salt: calcium stearate produced by NOF Corporation

Carbon black: DIABLACK I produced by Mitsubishi Chemical Corporation (ISAF carbon, average particle size: 23 nm, DBP oil absorption: 114 ml/100 g)

Stearic Acid: "KIRI" produced by NOF Corporation

Zinc oxide: Zinc oxide #2 produced by Mitsui Mining & Smelting Co., Ltd.

Age resistor: Nocrac 6C produced by Ouchi Shinko Chemical Industrial Co., Ltd. (N-(1,3-dimethylbutyl)-N'-phenyl-p-phenylenediamine)

Wax: SUNNOC Wax produced by Ouchi Shinko Chemical Industrial Co., Ltd.

Sulfur: sulfur powder produced by Tsurumi Chemical Industry Co., Ltd.

Vulcanization accelerator TBBS: Nocceler NS produced by Ouchi Shinko Chemical Industrial Co., Ltd.

Vulcanization accelerator DPG: Nocceler D produced by Ouchi Shinko Chemical Industrial Co., Ltd.

(Production of Modified BR)

BR (BR150B produced by Ube Industries, Ltd.) was dissolved in toluene to prepare a toluene solution having a BR content of 5% by mass. Subsequently, a modifying agent (3-(2-aminoethylamino)propyl trimethoxysilane) was added in an amount of 1.78 millimoles relative to 100 g of the BR, and the modification reaction was performed for 120 minutes in an autoclave. After the modification reaction, methanol was added to the autoclave and the contents of the autoclave were sufficiently stirred for 10 minutes. After the stirring, the entire amount of the resultant contents of the autoclave was filtrated, and thereby a modified polymer was separated from the solvent. The obtained modified polymer was dissolved in toluene, and methanol was added to the resultant solution so as to reprecipitate the modified polymer, followed by filtration. This cycle of the dissolution, reprecipitation, and filtration was repeated 3 times. Next, 0.11 parts by mass of an antioxidant (Irganox1010 (tetrakis-(methylene-3-(3',5'-di-t-butyl-4'-hydroxyphenyl)propionate)methane)) and 0.45 parts by mass of an age resistor (tris nonylphenyl phosphite) were added to 100 parts by mass of the modified polymer and kneaded. The resultant mixture was vacuum-dried at 100° C. for 1.5 hours to produce a modified BR to be used in examples. The nitrogen content of the modified BR was determined, and 210 ppm of nitrogen was detected.

(Production of Surface-Treated Silica (3))

1 kg of silica was charged in a Henschel mixer and mixed for 1 minute at room temperature. Thereafter, 127 g of a silane coupling agent (2) was added to the mixer, and mixed at 130° C. for 30 minutes to produce a surface-treated silica (3).

Examples 1 to 7 and Comparative Examples 1 to 6

The chemical agents in amounts shown in Process 1 in Table 1 were mixed and kneaded with a Banbury mixer to form a kneaded mass. The kneading start temperature was 30° C. in Examples 1, 2, 5, 6, and 7, 50° C. in Example 3, 65° C. in Example 4, and 90° C. in Comparative Examples 1 to 6. The kneading time was 330 seconds in Examples 1, 2, 5, and 6, 270 seconds in Example 3, 240 seconds in Example 4, 280 seconds in Example 7, 260 seconds in Comparative Example 1, and 210 seconds in Comparative Examples 2 to 6. The discharging temperature was 155° C. in all examples and comparative examples.

Next, the chemical agents in amounts shown in Process 2 in Table 1 were added to the kneaded mass obtained by Process 1, and they were kneaded with a Banbury mixer for 2 to 4 minutes so that the discharging temperature reached about 150° C. Thus, a kneaded mass was obtained.

Thereafter, the kneaded mass obtained through Process 2 was cooled, and the sulfur and the vulcanization accelerator(s) in amounts shown in Process 3 in Table 1 were added thereto. They were kneaded with a biaxial open roll mill at about 80° C. for three minutes to produce an unvulcanized rubber composition.

The produced unvulcanized rubber composition was press-vulcanized for 30 minutes at 150° C., so that a vulcanized rubber composition was produced.

Also, the produced unvulcanized rubber composition was molded into a tread shape and assembled with other tire components. Then, the assembled components were vulcanized at 150° C. for 30 minutes, whereby a test tire was produced.

The following evaluations were made with the vulcanized rubber compositions and test tires. Table 1 shows the results. In the evaluations shown below, Comparative Example 1 is the criterion comparative example in Examples 1 to 6 and Comparative Examples 1 to 4, and Comparative Example 5 is the criterion comparative example in Example 7 and Comparative Examples 5 and 6.

(Dispersion Ratio of Silica Component)

A test piece for measurement was cut out from a slab rubber sheet (2 mm×130 mm×130 mm) made of the vulcanized rubber composition, and the dispersion ratio of the silica component in the test piece was measured by the following method. First, the test piece for measurement was cut with a microtome under nitrogen atmosphere at a temperature of a glass transition point or lower to give a fresh smooth surface. Then, the dispersion ratio of the silica component was calculated from the ratio of the area occupied by a foreign matter, presumed to be an aggregate of the silica component, to the whole measured area of this smooth surface and the amount of the silica component in the test piece for measurement. The area of the foreign matter was measured with an optical microscope and an image analyzer by totaling the circle equivalent areas whose circle equivalent diameters were 4 μm or more. The dispersion ratio of the silica component was calculated by the equation shown below. According to this equation, the closer to 100% the dispersion ratio of the silica component is, the better the dispersion state of the silica component is.

$$\text{Dispersion ratio (\%) of silica component}=[1-(A/B)/(C/D)]\times 100$$

(In the equation, A represents the area of an aggregate of the silica component whose circle equivalent diameter is 4 μm or more, B represents a measured area, C represents the volume of the contained silica component, and D represents the volume of a test piece for measurement.)

(Hardness Index)

The hardness of each vulcanized rubber composition was determined with a Type A durometer in accordance with JIS K6253 "Rubber, vulcanized or thermoplastic–Determination of hardness". Based on the hardness index of the criterion comparative example regarded as 100, the measurement result of each formulation was expressed as an index value by the following equation. A great difference in the hardness index influences properties such as handling stability. Accordingly, in this evaluation, the amount of the silica component or the like was adjusted, and the vulcanized rubber compositions having similar hardness were compared with respect to properties. The permissible difference in the hardness index is ±2.

(Hardness index)=(Hardness of each formulation)/
(Hardness of criterion comparative example)×
100

(Breaking Energy Index)

The tensile strength and the elongation at break of a slab rubber sheet (2 mm×130 mm×130 mm) made of each vulcanized rubber composition were measured in accordance with JIS K6251 "Rubber, vulcanized or thermoplastic—Determination of tensile stress-strain properties". From the measurement results, the breaking energy was calculated by the formula: [tensile strength×elongation at break/2]. Based on the breaking index of the criterion comparative example regarded as 100, the measurement result of each formulation was expressed as an index value by the following equation. The larger the breaking energy index is, the better the mechanical strength is.

(Breaking energy index)=(Breaking energy of each
formulation)/(Breaking energy of criterion comparative example)×100

(Abrasion Resistance Index)

The produced tires of each formulation were mounted on a vehicle, and the decrease in the depth of tire grooves was measured after the vehicle had run 8000 km in a city area. Then, the running distance that decreased the depth of the tire grooves by 1 mm was calculated. Based on the abrasion resistance index of the criterion comparative example regarded as 100, the measurement result of each formulation was expressed as an index value by the following equation. The larger the abrasion resistance index is, the better the abrasion resistance is.

(Abrasion resistance index)=(Running distance that
decreased tire groove depth by 1 mm in each
formulation)/(Running distance that decreased
tire groove depth by 1 mm in criterion comparative example)×100

(Rolling Resistance Index)

A test piece for measurement was cut out from a slab rubber sheet (2 mm×130 mm×130 mm) made of each vulcanized rubber composition. Then, the tan δ of the test piece for measurement was determined with a viscoelasticity spectrometer VES (produced by Iwamoto Seisakusho Co., Ltd.) under the following conditions: a temperature of 50° C.; an initial strain of 10%; a dynamic strain of 2%; and a frequency of 10 Hz. Based on the rolling resistance index of the criterion comparative example regarded as 100, the measurement result of each formulation was expressed as an index value by the following equation. The larger the rolling resistance index is, the more favorable the rolling resistance is (the more the rolling resistance is reduced).

(Rolling resistance index)=(Tan δ of criterion comparative example)/(Tan δ of each formulation)×
100

(Wet Grip Performance Index)

The wet grip performance was evaluated based on the braking performance obtained by the Anti-Lock Brake System (ABS) evaluation test. That is, the above-mentioned tires of each formulation were mounted on a 1800-cc class passenger vehicle equipped with an ABS, an actual vehicle running test was performed on an asphalt road surface (condition of the road surface: wet, skid number: about 50), brakes were put on at 100 km/h, and the deceleration until the passenger vehicle stopped was calculated. The deceleration used herein refers to a distance required for the passenger vehicle to stop after the brakes are put on. Based on the wet grip performance index of the criterion comparative example regarded as 100, the measurement result of each formulation was expressed as an index value by the following equation. The larger the wet grip performance index is, the better the braking performance is, and the better the wet grip performance is.

(Wet grip performance index)=(Deceleration of criterion comparative example)/(Deceleration of each
formulation)×100

(Dry Grip Performance Index)

Sensory evaluation by a test driver was carried out with the above-mentioned vehicle (passenger vehicle used in the evaluation of wet grip performance) on starting, accelerating, and stopping on a dry road surface. In the sensory evaluation, the performance of the tire in criterion comparative example was regarded as 100. In the case where the test driver found that the performance of the tire in an example or comparative example was obviously improved compared to that in criterion comparative example, the performance of that tire was evaluated as 120. In the case where the test driver found that the performance of the tire in an example or comparative example was at a high level that had never been achieved in the tires of the same class and the same size, the performance of that tire was evaluated as 140.

TABLE 1

| | | | Example 1 | Example 2 | Example 3 | Example 4 | Example 5 | Example 6 | Comparative Example 1 |
|---|---|---|---|---|---|---|---|---|---|
| Formulation (parts by mass) | Process 1 | ENR | 80 | 80 | 80 | 80 | 80 | 80 | 80 |
| | | NR | 20 | 20 | 20 | 20 | 20 | 20 | 20 |
| | | BR | — | — | — | — | — | — | — |
| | | Modified BR | — | — | — | — | — | — | — |
| | | Modified S-SBR | — | — | — | — | — | — | — |
| | | Surface-treated silica (1) | 52 | 52 | 52 | 52 | — | — | — |
| | | Surface-treated silica (2) | — | — | — | — | 52 | — | — |
| | | Surface-treated silica (3) | — | — | — | — | — | 52 | — |

TABLE 1-continued

|  |  |  |  |  |  |  |  |  |
|---|---|---|---|---|---|---|---|---|
|  |  | Silica | — | — | — | — | — | — | 65 |
|  |  | Silane coupling agent (1) | — | 1.7 | 1.7 | 1.7 | 1.7 | — | 6 |
|  |  | Silane coupling agent (2) | — | — | — | — | — | 1.7 | — |
|  |  | Vegetable oil | 10 | 10 | 10 | 10 | 10 | 10 | 10 |
|  |  | Mineral oil | — | — | — | — | — | — | — |
|  |  | Alkaline fatty acid metal salt | 5 | 5 | 5 | 5 | 5 | 5 | 5 |
|  | Process 2 | Carbon black | 10 | 10 | 10 | 10 | 10 | 10 | 10 |
|  |  | Stearic acid | 2 | 2 | 2 | 2 | 2 | 2 | 2 |
|  |  | Zinc oxide | 3 | 3 | 3 | 3 | 3 | 3 | 3 |
|  |  | Age resistor | 1.5 | 1.5 | 1.5 | 1.5 | 1.5 | 1.5 | 1.5 |
|  |  | Wax | 1.5 | 1.5 | 1.5 | 1.5 | 1.5 | 1.5 | 1.5 |
|  | Process 3 | Sulfur | 1.8 | 1.8 | 1.8 | 1.8 | 1.8 | 1.8 | 1.8 |
|  |  | Vulcanization accelerator TBBS | 2.1 | 2.1 | 2.1 | 2.1 | 2.1 | 2.1 | 2.1 |
|  |  | Vulcanization accelerator DPG | — | — | — | — | — | — | — |
| Evaluation | (a) Dispersion ratio of silica component (%) | | 91 | 95 | 78 | 71 | 90 | 97 | 90 |
|  | (b) Hardness index | | 100 | 98 | 99 | 101 | 100 | 98 | 100 |
|  | (c) Breaking energy index | | 146 | 156 | 137 | 118 | 144 | 164 | 100 |
|  | (d) Abrasion resistance index | | 125 | 132 | 119 | 111 | 124 | 139 | 100 |
|  | (e) Rolling resistance index | | 109 | 112 | 110 | 108 | 109 | 115 | 100 |
|  | (f) Wet grip performance index | | 103 | 104 | 106 | 103 | 102 | 106 | 100 |
|  | (g) Dry grip performance index | | 105 | 100 | 100 | 105 | 105 | 103 | 100 |
|  | Average performance of (a) and (c) to (g) | | 113 | 117 | 108 | 103 | 112 | 121 | 98 |
|  | Average performance of (d) to (g) | | 111 | 112 | 109 | 107 | 110 | 116 | 100 |

|  |  |  | Comparative Example 2 | Comparative Example 3 | Comparative Example 4 | Example 7 | Comparative Example 5 | Comparative Example 6 |
|---|---|---|---|---|---|---|---|---|
| Formulation (parts by mass) | Process 1 | ENR | 80 | 80 | 80 | — | — | — |
|  |  | NR | 20 | 20 | 20 | 20 | 20 | 20 |
|  |  | BR | — | — | — | — | 30 | 30 |
|  |  | Modified BR | — | — | — | 30 | — | — |
|  |  | Modified S-SBR | — | — | — | 50 | 50 | 50 |
|  |  | Surface-treated silica (1) | 52 | — | — | 52 | — | 52 |
|  |  | Surface-treated silica (2) | — | 52 | — | — | — | — |
|  |  | Surface-treated silica (3) | — | — | 52 | — | — | — |
|  |  | Silica | — | — | — | — | 65 | — |
|  |  | Silane coupling agent (1) | — | — | — | 1.7 | 6 | — |
|  |  | Silane coupling agent (2) | — | — | — | — | — | — |
|  |  | Vegetable oil | 10 | 10 | 10 | — | — | — |
|  |  | Mineral oil | — | — | — | 10 | 10 | 10 |
|  |  | Alkaline fatty acid metal salt | 5 | 5 | 5 | — | — | — |
|  | Process 2 | Carbon black | 10 | 10 | 10 | 5 | 5 | 5 |
|  |  | Stearic acid | 2 | 2 | 2 | 2 | 2 | 2 |
|  |  | Zinc oxide | 3 | 3 | 3 | 3 | 3 | 3 |
|  |  | Age resistor | 1.5 | 1.5 | 1.5 | 1.5 | 1.5 | 1.5 |
|  |  | Wax | 1.5 | 1.5 | 1.5 | 1.5 | 1.5 | 1.5 |
|  | Process 3 | Sulfur | 1.8 | 1.8 | 1.8 | 1.5 | 1.5 | 1.5 |
|  |  | Vulcanization accelerator TBBS | 2.1 | 2.1 | 2.1 | 1.5 | 1.5 | 1.5 |
|  |  | Vulcanization accelerator DPG | — | — | — | 0.5 | 0.5 | 0.5 |
| Evaluation | (a) Dispersion ratio of silica component (%) | | 60 | 55 | 62 | 90 | 95 | 65 |
|  | (b) Hardness index | | 99 | 100 | 99 | 98 | 100 | 100 |
|  | (c) Breaking energy index | | 112 | 105 | 118 | 128 | 100 | 114 |
|  | (d) Abrasion resistance index | | 104 | 96 | 108 | 116 | 100 | 104 |
|  | (e) Rolling resistance index | | 103 | 101 | 105 | 106 | 100 | 103 |
|  | (f) Wet grip performance index | | 96 | 94 | 101 | 104 | 100 | 96 |
|  | (g) Dry grip performance index | | 100 | 100 | 100 | 100 | 100 | 100 |
|  | Average performance of (a) and (c) to (g) | | 96 | 92 | 99 | 107 | 99 | 97 |
|  | Average performance of (d) to (g) | | 101 | 98 | 104 | 107 | 100 | 101 |

Examples 1 to 6, in each of which the rubber composition contained a modified diene rubber and a surface-treated silica and the dispersion ratio of a silica component exceeded the required value for the present invention, exhibited improved performances in a good balance, and especially, breaking energy, abrasion resistance, and rolling resistance had been significantly improved, in comparison with Comparative Example 1, a criterion comparative example. In particular, in Examples 2 and 6, the performances were more significantly improved. This was presumably because the dispersion ratio of a silica component was improved by decreasing the kneading start temperature in Process 1 and using a granule-type surface-treated silica (Example 2) or a surface-treated silica treated with a silane coupling agent having a mercapto group and having high reactivity with polymers (Example 6).

On the other hand, Comparative Examples 2 to 4, in each of which the rubber composition contained a modified diene rubber and a surface-treated silica and the dispersion ratio of a silica component did not satisfy the requirement of the present invention, exhibited lower performance improvement effects than those in Examples 1 to 6.

Example 7 and Comparative Examples 5 and 6, in which rubber components different from those in Examples 1 to 6 and Comparative Examples 1 to 4 were used, also exhibited the same tendencies as Examples 1 to 6 and Comparative Examples 1 to 4.

The invention claimed is:
1. A tire rubber composition comprising:
 a rubber component that contains a modified diene rubber; and
 a silica component that contains a silica surface-treated with a silane coupling agent, wherein the amount of said modified diene rubber in 100% by mass of said rubber component is 15% by mass or more, the dispersion ratio of said silica component is 78% or higher, and the tire rubber composition is obtained by kneading said rubber component and said silica component at a kneading start temperature of 50° C. or lower.

2. The tire rubber composition according to claim 1, wherein said modified diene rubber has two or more modified groups in one molecule thereof.

3. A pneumatic tire formed from the rubber composition according to claim 1.

4. The tire rubber composition according to claim 1, further comprising a carbon black.

5. The tire rubber composition according to claim 1, further comprising a vegetable oil.

6. The tire rubber composition according to claim 1, further comprising calcium stearate.

7. A pneumatic tire formed from the rubber composition according to claim 2.

8. A pneumatic tire formed from the rubber composition according to claim 2, wherein the rubber composition further comprises carbon black, a vegetable oil, and calcium stearate.

* * * * *